United States Patent Office 3,427,251
Patented Feb. 11, 1969

3,427,251
GELATINOUS PREPARATIONS CONTAINING QUATERNARY AMMONIUM SALT DERIVATIVES
Alfred Berger, Reinach, and Burkhart Lange, Basel, Switzerland, assignors to Ciba Limited, Basel, Switzerland, a Swiss company
No Drawing. Filed Apr. 29, 1964, Ser. No. 363,632
Claims priority, application Switzerland, May 3, 1963, 5,586/63
U.S. Cl. 252—316    2 Claims
Int. Cl. B01j *13/00;* C07c *103/54*

It is known that gel-forming products can be manufactured from both anionic and cationic substances. As proposed in U.S. specification 2,940,902, patented June 14, 1960, to Fritz Artur Vorsatz, salts of anionic compounds, for example alkali metal salts of fatty acids or fatty alcohol sulphates, are reacted inter alia with basic quaternary ammonium compounds, whereupon the reaction product is converted into a gel by adding water. The gels formed are unstable towards the addition of anionic or cationic products because they turn liquid. There was therefore a demand for gel-forming products capable of yielding transparent gels tolerated by the skin which are stable within a wide pH range and remain gels on addition of cationic, nonionic and, if desired, also anionic compound.

It has been found that salts of selected quaternary acid ammonium compounds in an aqueous solution, preferably in an amount of 5 to 10% by weight related to water, produce gel-like preparations distinguished by their clarity and transparency and which offer over the known gel-formers the advantage that they remain gels even on addition of nonionic or cationic substances over a wide pH range from 3 to 8, preferably from 4 to 7. This makes it possible, for example, to convert aqueous solutions containing active principles into gels even within the acid range.

The salts used as gel-formers according to the invention belong with respect to the acid constituent to the known group of quaternary compounds quaternated with a halogencarboxylic acid; this endows them with anionic properties. The quaternary acid ammonium group of the products of the invention corresponds to the following general formula

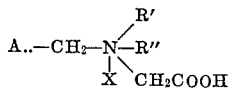

where A represents a hydrocarbon radical of 13 to 17 carbon atoms bound through the amido grouping —CONH—; R' and R" each represents the methyl or ethyl group, and X represents chlorine or bromine. Owing to the presence of a free carboxyl group the aqueous solutions of the quaternary compounds have a pH value of 1 to 2. The formation of salts—more especially at a concentration from 5 to 10%—leads to the formation of gels. Experiments have revealed that salts of likewise anionic quaternary ammonium compounds having a structure different from that of the products to be used according to this invention, namely the structure

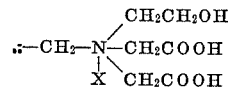
or
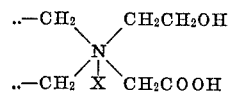

are incapable of forming clear, stable gels. The same is true of salts of anionic compounds containing a tertiary nitrogen atom of the structure

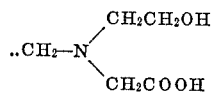
or
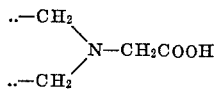

Furthermore, it has been found that the high-molecular residue in A must have a special structure since otherwise no gels are formed. This residue must be acylic and unsubstituted, and it must contain 13 to 17 carbon atoms. When lauric acid ($C_{12}$), benzoic acid or ricinoleic acid is used as starting material, the salts of the corresponding anionic quaternary ammonium compounds do not give rise to gels.

The present invention provides gel-like preparations, more especially cosmetic and pharmaceutical preparations, in the gel-like or highly viscous state, containing as gel-former a preferred proportion of 5 to 10% by weight related to the amount of water present, of a salt of a basic compound and of an acid quaternary compound of the general formula

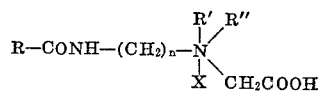

where R represents an aliphatic, saturated or unsaturated, hydrocarbon residue containing 13 to 17 carbon atoms; R' and R" each represents the methyl or ethyl group; X stands for chlorine or bromine and $n=2$ or 3. The residue R represents the residue of myristic, palmitic, stearic, oleic or linoleic acid; R' and R" are preferably methyl groups and X represents preferably chlorine.

Substances capable of forming salts may belong to a wide variety of basic compounds, for example alkali metal hydroxides, especially sodium hydroxide, ammonia and alkanolamines such as triethanolamine. Preferred use is made of non-quaternary starting materials, namely the basic tertiary amines of the general formula

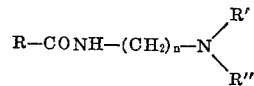

where R represents an aliphatic, saturated or unsaturated, hydrocarbon residue containing 13 to 17 carbon atoms; R' and R" each represents the methyl or ethyl group and $n=2$ or 3.

The salt is formed in general by mixing equivalent amounts of the anionic quaternary compound with the basic compound. Salts obtained by using the aforementioned tertiary amines are advantageously manufactured by reacting 1 mol of chloroacetic or bromoacetic acid with 2 mols of the basic tertiary amine.

The salt formation with the use of an alkali metal hydroxide or an alkanolamine is advantageously performed in an aqueous solution, preferably at an elevated temperature; in this connection it is not absolutely necessary to add an equivalent amount of the basic compound; it may suffice to form a weakly acidic or weakly basic salt. For example: 0.8 mol of triethanolamine and 1 mol of N,N-dimethylaminopropyl oleic acid amide quaternated with chloroacetic acid yield an acid salt whose aqueous solution has a pH value of 4.9. The aqueous solution of the free, acid, quaternary product has a pH value of 1.75. When 1 mol of triethanolamine is used, there is obtained the practically neutral salt of pH 6.8 and with 1.2 mols of triethanolamine the basic salt having a pH of 7.5. All three types of salt form gels. Thus, the term "salt" as used in this specification includes all types of salts having a pH from 3 to 8, preferably from 4 to 7.

The gelatinous preparations of the invention are suitable for a wide variety of uses. They are particularly suitable for use as cosmetics and pharmaceuticals. The salts used as gel-formers are compatible with various active principles, and above all the gels are good solvents for cationic and nonionic products, including shampoos and hand washing agents, skin treatment preparations, hair dyes, hair setting preparations, bactericides and disinfectants. The gelatinous preparations of the invention are in the highly viscous or salve-like state or they may form a stiff gel.

It is also of interest to note that the salts have by themselves a washing and lathering effect. Furthermore, when used by themselves they have a distinct rejuvenating effect on the hair which finds its expression primarily in a soft, natural feel, better combing properties and in improved elasticity. In addition, hair treated with the salt alone, for example when being washed, has a silky, soft feel.

Salve-like preparations that contain cosmetic or pharmaceutical active substances have the advantage that they are rapidly absorbed by the skin and thus facilitate the penetration of the active substance. Suitable active substances are metal salts, salicyclic acid, boric acid, hormones, vitamins or local anaesthetics.

EXAMPLE 1

Salt No. 1

73 parts (2 mols) of N,N-dimethylaminopropyl oleic acid amide of the formula

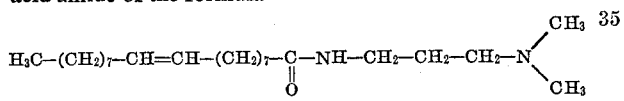

are heated in a stirring vessel to 55 to 60° C. In the course of 30 minutes 9.4 parts of chloroacetic acid (1 mol) are introduced, the air is displaced by nitrogen and the mixture is heated for another 4 hours at 55 to 60° C. A viscid paste is obtained which at a concentration of 10% forms a clear gel in water.

Salts Nos. 2–5

The salts Nos. 2–5 of the following table are salts prepared from the starting materials A and B. Column A discloses the starting compounds containing a tertiary nitrogen atom. When 2 mols are used, cf. salts Nos. 2 and 3, 1 mol is the basic compound forming the salt of the resulting acidic quaternated compound. Column B discloses the quaternating agent and in the case of Nos. 3 and 4 in addition the basic compound forming the salt of the resulting acidic quarternated compound.

| Salts | A | B |
|---|---|---|
| No. 2 | 2 mols of N,N-dimethylaminopropyl myristic acid amide. | 1 mol of chlorol acetic acid. |
| No. 3 | 2 mols of N,N-diethylaminoethyl oleic acid amide. | 1 mol of bromoacetic acid. |
| No. 4 | 1 mol of N,N-diethylaminopropyl oleic acid amide. | 1 mol of chloroacetic acid +1 mol of NaOH. |
| No. 5 | 1 mol of N,N-dimethylaminopropyl linseed oil fatty acid amide. | 1 mol of chloroacetic acid +1 mol of triethanolamine. |

EXAMPLE 2

The salts Nos. 1 to 5, as gel formers in the manufacture of gel-like preparations, are used as follows:

(a) Shampoo: Parts
Salt No. 1 at 100% _____ 8.6
Cetyl dimethyl - (2-hydroxyethyl)-ammonium chloride _____ 4.0
Water _____ 87.4

The aqueous solution of cetyl dimethyl-(2-hydroxyethyl)-ammonium chloride has practically the same viscosity as water. When this solution is heated to about 50° C., and the indicated amount of the salt No. 1 is added, there is obtained on cooling a stiff, clear gel having a pH value of 7.0. The clear gel is perfumed and can be used as a shampoo.

(b) Salve base: Parts
Salt No. 2 at 100% _____ 7.5
Condensation product from hydroabietyl alcohol and 100 mols of ethylene oxide __ 15.0
Water _____ 77.5

100.0

The aqueous solution of the hydroabietyl condensation product has practically the same viscosity as water. After heating and adding the salt No. 2, a clear gel of pH 6.8 is obtained which is used as a salve base.

(c) Salve base: Parts
Salt No. 3 _____ 7.5
Polyethyleneglycol of average molecular weight of about 1500 _____ 15.0
Water _____ 77.5

100.0

The viscosity of the aqueous solution of the polyethyleneglycol differs only little from that of water. After heating and adding the salt No. 3 a clear gel of pH 6.6 is obtained which is used as a salve base.

(d) Oxidant for hair treatment: Parts
Salt No. 4 _____ 5.0
Hydrogen peroxide 100% _____ 4.5
Water _____ 90.5

100.0

The salt is added to the aqueous hydrogen peroxide solution with slight heating. A clear gel is obtained which is adjusted with lactic acid to pH=5.2, if desired perfumed, and used for the oxidative treatment of hair.

(e) Hair dyeing preparation:

Using 10% of the salt No. 5 excellent dyeing gels are obtained with basic dyestuffs in a concentration of 0.01 to 0.02%, which gels may be used for dyeing hair.

The general composition is as follows:
Parts
Salt No. 5 _____ 10.000
Dyestuff, about _____ 0.015
Water _____ 90.000

About 100.000

The following dyestuffs are suitable:

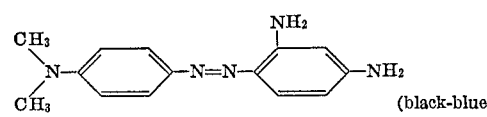
(black-blue)

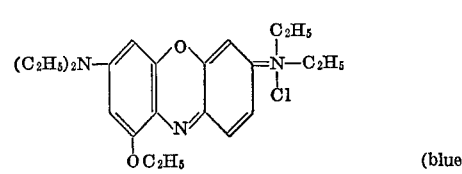
(blue)

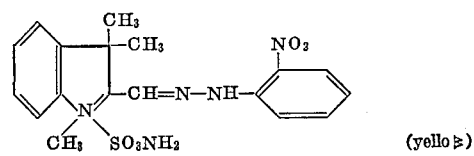
(yellow)

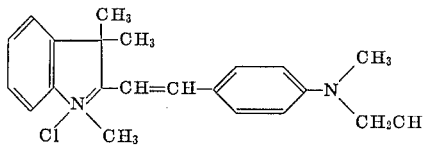

(f) Washing preparation:

| | Parts |
|---|---|
| Salt No. 2 | 8.6 |
| 2-caprinyl-imidazolinium-3-ethoxy-3-acetate, sodium salt | 6.2 |
| Water | 85.2 |
| | 100.0 |

The viscosity of the aqueous solution of the sodium salt of 2-caprinyl-imidazolinium - 3 - ethoxy - 3 - acetate is practically the same as that of water. After heating to about 50° C. and adding the salt No. 2 a clear gel of pH 7.7 is obtained; it is perfumed and used as a washing preparation, especially for the hands.

(g) Corticosteroid gel

A gel suitable for the treatment of the skin is prepared from:

| | Parts |
|---|---|
| Dexamethasone trimethyl acetate | 0.02 |
| Salt No. 1 | 10.00 |
| Deionised water up to | 90.00 |
| | About 100.00 |

What is claimed is:

1. Gelatinous compositions consisting essentially of water and as gel-former, in an amount of 5 to 10 percent by weight calculated on the water present, a salt of (1) a basic compound corresponding to the formula

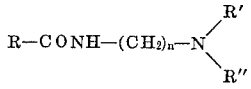

where R represents an aliphatic hydrocarbon radical containing 13 to 17 carbon atoms, R' and R'' each represents an alkyl group selected from the group consisting of methyl and ethyl, and $n$ is at least 2 and most 3, and of (2) an acid quaternary compound corresponding to the formula

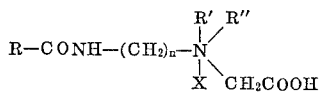

where R represents an aliphatic hydrocarbon radical containing 13 to 17 carbon atoms, R' and R'' each represents an alkyl group selected from the group consisting of methyl and ethyl, X represents a halogen atom selected from the group consisting of chlorine and bromine and $n$ is at least 2 and at most 3.

2. Gelatinous compositions consisting essentially of water and as gel-former, in an amount of 5 to 10 percent by weight calculated on the water present, a salt of (1) a basic compound corresponding to the formula

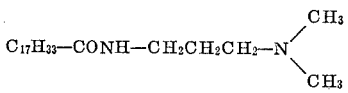

and of an acid quaternary compound corresponding to the formula

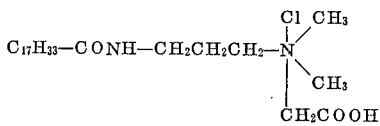

References Cited

UNITED STATES PATENTS

| 3,328,307 | 6/1967 | Schmitz | 252—152 XR |
| 3,225,074 | 12/1965 | Cowen et al. | 260—404.5 |

LEON D. ROSDOL, *Primary Examiner.*

STANLEY D. SCHWARTZ, *Assistant Examiner.*

U.S. Cl. X.R.

252—106, 152, 316; 424—358, 365